US011820170B2

(12) United States Patent
Spoelstra

(10) Patent No.: US 11,820,170 B2
(45) Date of Patent: Nov. 21, 2023

(54) RETRACTABLE GUARD ASSEMBLIES

(71) Applicant: Alcon Inc., Fribourg (CH)

(72) Inventor: Brandon L. Spoelstra, Trabuco Canyon, CA (US)

(73) Assignee: Alcon Inc., Fribourg (CH)

( * ) Notice: Subject to any disclaimer, the term of this patent is extended or adjusted under 35 U.S.C. 154(b) by 0 days.

(21) Appl. No.: 17/805,580

(22) Filed: Jun. 6, 2022

(65) Prior Publication Data
US 2023/0001740 A1 Jan. 5, 2023

Related U.S. Application Data

(60) Provisional application No. 63/217,390, filed on Jul. 1, 2021.

(51) Int. Cl.
*B60B 33/00* (2006.01)
*B60B 33/06* (2006.01)

(52) U.S. Cl.
CPC .......... *B60B 33/0028* (2013.01); *B60B 33/06* (2013.01); *B60B 33/00* (2013.01)

(58) Field of Classification Search
CPC ..... B60B 33/0028; B60B 33/06; B60B 33/00; B60R 2019/002
USPC .............................................. 16/18 CG, 18 B
See application file for complete search history.

(56) References Cited

U.S. PATENT DOCUMENTS

| | | | | | |
|---|---|---|---|---|---|
| 2,996,752 A | * | 8/1961 | Pope | ................... | B60B 33/0002 293/58 |
| 3,441,974 A | * | 5/1969 | Hollie | ................. | A47B 91/028 16/33 |
| 4,025,099 A | * | 5/1977 | Virden | ................... | B60B 33/00 293/58 |
| 5,001,808 A | * | 3/1991 | Chung | ................... | B60B 33/06 16/33 |
| 5,170,528 A | * | 12/1992 | Navar | ................. | B60B 33/0028 280/160 |
| 5,371,920 A | * | 12/1994 | Rainville | ............ | B60B 33/0028 128/203.12 |
| 5,702,117 A | * | 12/1997 | Geelhoed | ............. | A61B 6/4405 280/160 |

(Continued)

FOREIGN PATENT DOCUMENTS

| | | |
|---|---|---|
| CN | 110861446 A | 3/2020 |
| DE | 102006049071 B3 | 11/2007 |
| EP | 0085984 A1 | 8/1983 |

*Primary Examiner* — Jeffrey O'Brien

(57) ABSTRACT

Particular embodiments disclosed herein provide a retractable guard assembly coupled to a caster of a mobile equipment, comprising a housing and one or more guards at least partially disposed in the housing. The one or more guards are independently movably coupled to the housing. The retractable guard assembly further comprises corresponding one or more biasing elements coupled to the one or more guards and to the housing for biasing the one or more guards towards a fully deployed state. When the one or more guards are in the fully deployed state, contact between a fixed object and a portion of the one or more guards disposed outside the housing causes the one or more guards to transition into a retracted state, and when the contact is removed, the corresponding one or more biasing elements cause the one or more guards to transition into the fully deployed state.

11 Claims, 6 Drawing Sheets

(56) References Cited

U.S. PATENT DOCUMENTS

| | | | | |
|---|---|---|---|---|
| 5,873,144 | A | * | 2/1999 | Tupper ..................... B60B 7/08 16/18 CG |
| 5,983,452 | A | * | 11/1999 | McGovern .............. B60B 33/00 16/18 B |
| 6,626,445 | B2 | | 9/2003 | Murphy |
| 6,678,917 | B1 | * | 1/2004 | Winters ................... B60B 7/00 16/18 CG |
| 8,602,466 | B2 | * | 12/2013 | Barron ................... B60R 21/34 293/58 |
| 8,684,145 | B2 | * | 4/2014 | Boukhny ............ B60B 33/0078 188/68 |
| 8,910,344 | B2 | * | 12/2014 | Nguyen ................. B60B 7/061 16/34 |
| 9,669,655 | B1 | * | 6/2017 | Soliman ................... B60B 7/04 |
| 9,944,120 | B1 | * | 4/2018 | Butler ................ B60B 33/0063 |
| 10,023,007 | B2 | * | 7/2018 | Horch ................ B60B 33/0094 |
| D859,133 | S | * | 9/2019 | Dubas ........................... D8/375 |
| 10,442,246 | B2 | * | 10/2019 | Barker ................... B60B 33/00 |
| 2017/0190212 | A1 | * | 7/2017 | Horch ............... B60B 33/0049 |
| 2018/0281718 | A1 | * | 10/2018 | Barker ................... B60B 33/00 |
| 2022/0063330 | A1 | * | 3/2022 | Monteleone ........ B60B 33/0039 |

* cited by examiner (Guards Deployed)

(Guards Retracted)

RETRACTABLE GUARD ASSEMBLIES

PRIORITY CLAIM

This application claims the benefit of priority of U.S. Provisional Patent Application Ser. No. 63/217,390 titled "RETRACTABLE GUARD ASSEMBLIES," filed on Jul. 1, 2021, whose inventor is Brandon L. Spoelstra, which is hereby incorporated by reference in its entirety as though fully and completely set forth herein.

BACKGROUND

Field

The present disclosure relates generally to retractable guard assemblies for use in connection with casters of mobile equipment, such as medical or non-medical equipment.

Description of the Related Art

Many types of equipment, particularly medical equipment, have rotating caster wheels such that they can be mobile and moved around. For example, this mobility allows medical staff to move medical equipment around in operating rooms, from one operating room to another, from one floor to another (e.g., using elevators), etc. However, in certain cases, an equipment (e.g., medical equipment) rolling on caster wheels may bind when the equipment is rolled onto electrical cables, fluid hoses, and other similar objects. This is a nuisance to the equipment operator and reduces the equipment's mobility. Further, it can cause the equipment to tip over, damage the electrical cables, pinch hoses shut, and pose other similar issues.

In certain cases, certain existing cable guards are used in conjunction with casters for purposes of pushing cables and hoses aside, such as to prevent the equipment from rolling onto the cables and hoses and causing the issues discussed above. However, the existing cable guards pose certain additional and undesired issues. For example, some of the existing cable guards have to be removed and stored when the equipment is moved over fixed obstacles such as doorsills and elevator sills or non-fixed but difficult-to-move obstacles such as floor mats. Forcing an equipment operator to remove and store cable guards every time the equipment has to be moved over such objects, however, is extremely burdensome for the operator.

Some of the other existing cable guards are in a fixed position and, therefore, cannot even be removed when the equipment is about to move over fixed obstacles. As such, the fixed cable guards bind on such obstacles and can cause the equipment to tip over.

BRIEF SUMMARY

The present disclosure relates generally to retractable guard assemblies for use in connection with casters of mobile equipment, such as medical or non-medical equipment.

Particular embodiments disclosed herein provide a retractable guard assembly coupled to a caster of a mobile equipment, comprising a housing and one or more guards at least partially disposed in the housing. The one or more guards are independently movably coupled to the housing. The retractable guard assembly further comprises corresponding one or more biasing elements coupled to the one or more guards and to the housing for biasing the one or more guards towards a fully deployed state. When the one or more guards are in the fully deployed state, contact between a fixed object and a portion of the one or more guards disposed outside the housing causes the one or more guards to transition into a retracted state. When the one or more guards are in the retracted state and when the contact is removed, the corresponding one or more biasing elements cause the one or more guards to transition into the fully deployed state. In the fully deployed state, the one or more guards have a first clearance with the ground. In the retracted state, the one or more guards have a second clearance with the ground, and the second clearance is larger than the first clearance.

Particular embodiments disclosed herein provide a caster assembly of a mobile equipment, comprising a caster comprising a caster wheel and a retractable guard assembly coupled to the caster. The retractable guard assembly comprises a housing and one or more guards at least partially disposed in the housing. The one or more guards are independently movably coupled to the housing. The retractable guard assembly further comprises corresponding one or more biasing elements coupled to the one or more guards and to the housing for biasing the one or more guards towards a fully deployed state. When the one or more guards are in the fully deployed state, contact between a fixed object and a portion of the one or more guards disposed outside the housing causes the one or more guards to transition into a retracted state. When the one or more guards are in the retracted state and when the contact is removed, the corresponding one or more biasing elements cause the one or more guards to transition into the fully deployed state. In the fully deployed state, the one or more guards have a first clearance with the ground. In the retracted state, the one or more guards have a second clearance with the ground, and the second clearance is larger than the first clearance.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Particular embodiments of the present disclosure provide retractable guard assemblies that may be used in connection with casters of mobile equipment. While the embodiments below describe retractable guard assemblies that are mounted on casters and used in connection with a medical equipment, such as an ophthalmic surgical console, those of ordinary skill in the art appreciate that the retractable guard assemblies described herein may be used in conjunction with a variety of medical and non-medical equipment. Examples of such medical equipment include surgical and non-surgical consoles, diagnostic equipment, hospital beds, hospital carts, stretchers, IV (intravenous) poles and other mobile medical equipment. Examples of non-medical equipment include any mobile electrical and/or mechanical devices and accessories with casters.

Embodiments disclosed herein provide a caster with a retractable guard assembly which self-retracts when the respective caster wheel encounters fixed objects. Self-retracting guard assemblies allow mobile equipment to be easily moved over fixed objects without requiring action by the user. Furthermore, the retractable guard assemblies disclosed herein retract only when contacting objects that exert counter force (against the respective guards of the retractable guard assemblies) that is large enough to satisfy a threshold condition. This mechanism allows a retractable guard assembly to push loose objects out of the path of a corresponding caster wheel to prevent the caster wheel from binding on loose objects while at the same time allowing the caster wheel to move over fixed objects. In addition, the retractable guard assemblies disclosed herein are designed to yield to fixed objects approaching from any direction including from the front, rear, or below (e.g., when mobile equipment is set down or maneuvered up or down a ledge).

Figure 1:
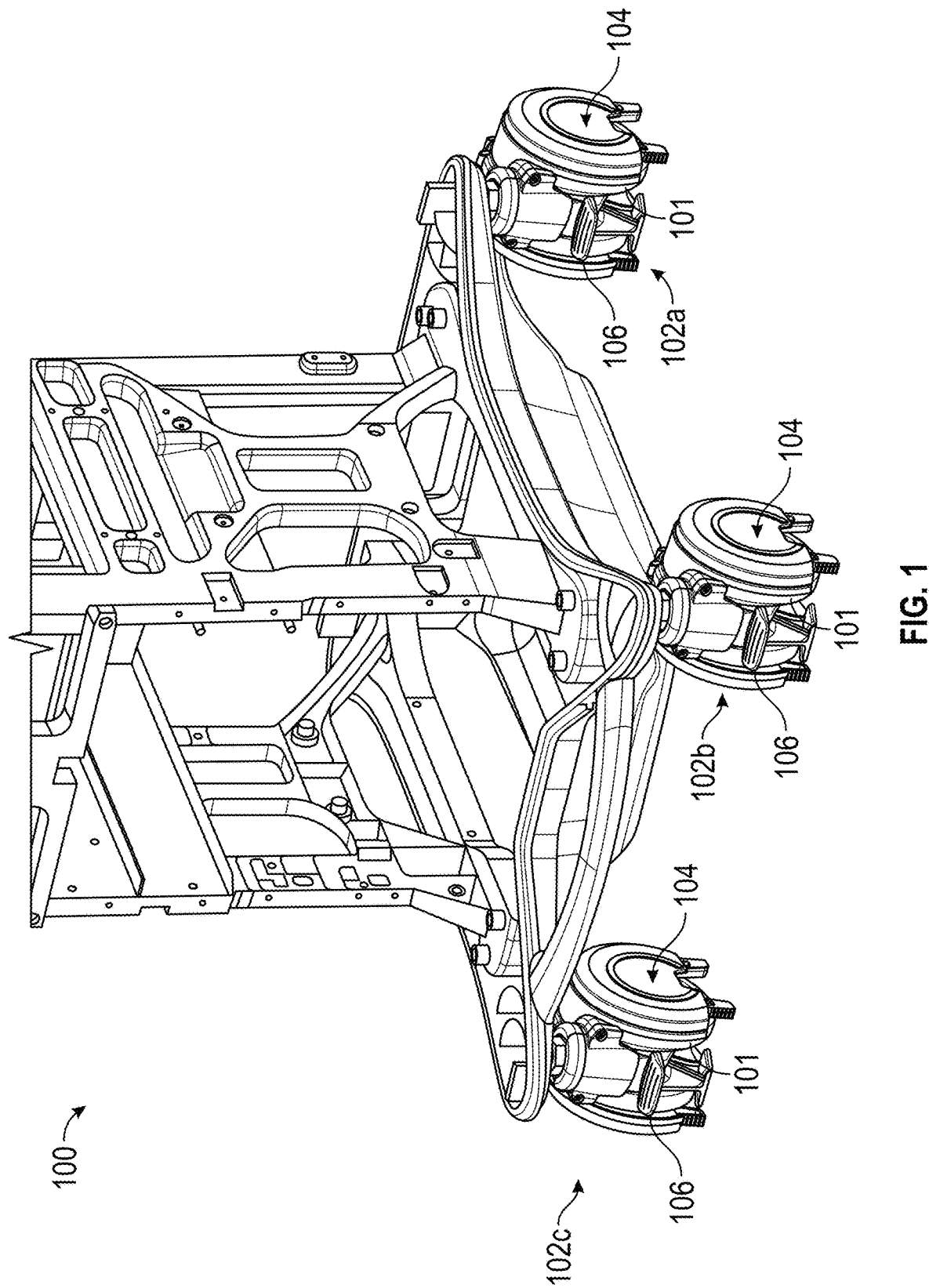
FIG. 1 illustrates a medical equipment including four caster assemblies, in accordance with certain embodiments of the present disclosure.

FIG. 1 illustrates a medical equipment 100 including four caster assemblies 102a, 102b, 102c, and 102d (not shown). As shown, each caster assembly 102 includes a caster (e.g., caster 303, shown in FIG. 3A) with a rotating caster wheel ("caster wheel") 101 and a caster lock toehold 106. Pressing caster lock toehold 106 causes it to make contact with the ground and, therefore, create friction that may prevent a corresponding caster wheel 101 from rotating.

Each caster assembly 102 also includes a retractable guard assembly 104, as described in more detail below. In certain embodiments, each retractable guard assembly 104 is mounted on a corresponding caster during the manufacturing process. As further described in relation to FIGS. 2A-2C, each retractable guard assembly 104 comprises one or more guards which are independently movable with respect to each other and with respect to caster assembly 102. When deployed, the guards are configured to push objects such as cables, hoses, and other similar objects aside. In the deployed state, the guards provide a certain amount of clearance with the ground in order to allow medical equipment 100 to be moved around. The clearance (e.g., distance between the bottom of the guards and the ground), however, is configured such that the guards are still able to make contact with cables, hoses, and other similar objects and push them aside. When one or more of the guards contact an object which is not intended to be pushed aside, the corresponding guards are retracted, thereby creating a larger clearance with the ground, such that medical equipment 100 can be easily moved over fixed objects (e.g., obstacles), such as doorsills and elevator sills, and other difficult-to-move obstacles such as floor mats. Note that, in certain embodiments, any difficult-to-move obstacles may be considered as fixed objects. As used herein, the term "fixed object" refers to any object that exerts a large enough force on at least one of the guards, thereby, causing the guard to retract.

Figure 2A:
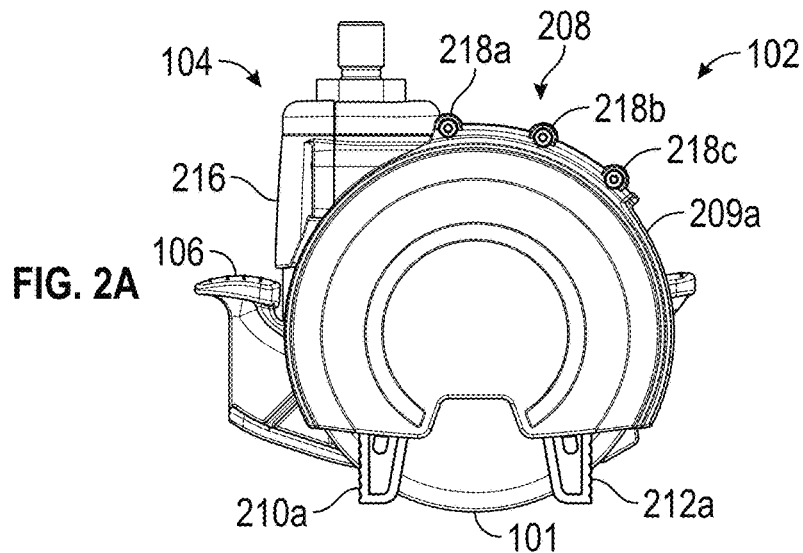
FIG. 2A illustrates a side view of a caster assembly of FIG. 1 including a retractable guard assembly in a deployed state, in accordance with certain embodiments of the present disclosure.
Figure 2B:
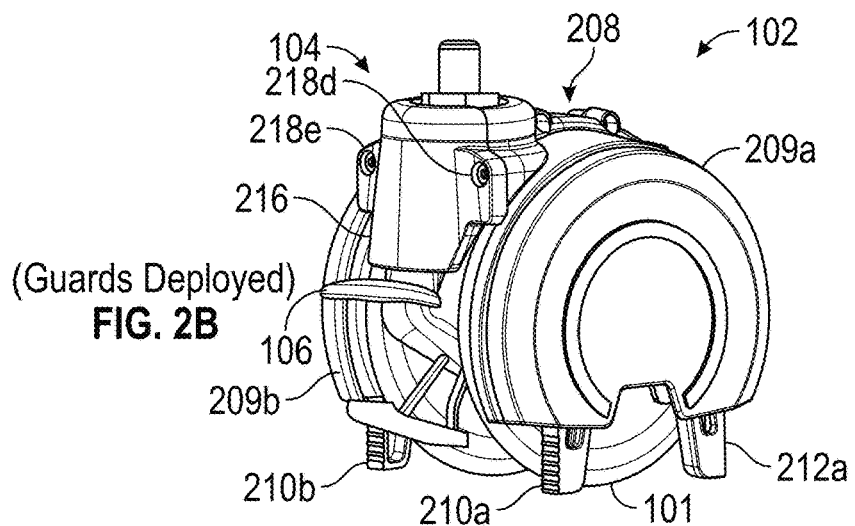
FIG. 2B illustrates a perspective view of the caster assembly of FIG. 2A, in accordance with certain embodiments of the present disclosure.
Figure 2C:
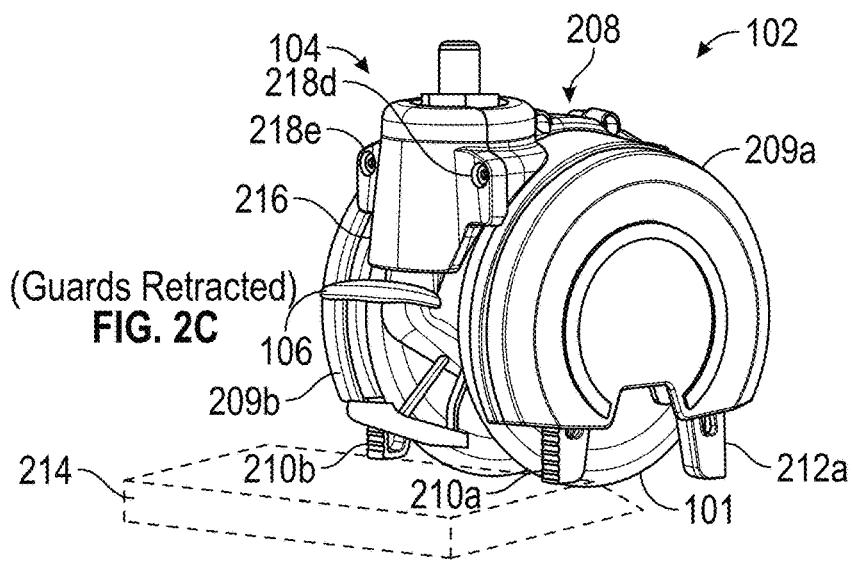
FIG. 2C illustrates a perspective view of the caster assembly of FIG. 2B including the retractable guard assembly with front guards in a retracted state, in accordance with certain embodiments of the present disclosure.

FIG. 2A illustrates a side view of a caster assembly 102 of FIG. 1 including a retractable guard assembly 104 in a deployed state, according to some embodiments. FIG. 2B illustrates a perspective view of caster assembly 102 including retractable guard assembly 104 in a deployed state, according to some embodiments. FIG. 2C illustrates a perspective view of caster assembly 102 including retractable guard assembly 104 with front guards 210a in a retracted state, according to some embodiments. Caster assembly 102, shown in FIGS. 2A-2C may be any one of caster assemblies 102a, 102b, 102c, or 102d of FIG. 1. FIGS. 2A-2C are described together herein for clarity.

Retractable guard assembly 104 is mounted on a caster (shown as caster 303 in FIG. 3A) that includes a caster wheel 101 and a caster lock toehold 106, among other components. Retractable guard assembly 104 comprises a housing 208, front guards 210, rear guards 212, a collar 216, screws 218, as well as other components shown in more detail in FIG. 3A. Housing 208 comprises two housing pieces 209a and 209b. In FIG. 2A, only housing piece 209a is shown but housing piece 209b is partly shown in FIGS. 2B and 2C. Housing pieces 209a and 209b are coupled together using screws 218a-218c. Housing pieces 209a and 209b are indirectly coupled together through collar 216. Housing piece 209a is coupled to collar 216 using screw 218d, and housing piece 209b is coupled to collar 216 using screw 218e. Front guards 210 and rear guards 212 are at least partially disposed in housing 208. Only portions of front guards 210 and rear guards 212 which are disposed outside housing 208 are visible in FIGS. 2A-2C. As shown, front guards 210a and 210b are positioned symmetrically such that there is a front guard on each side of caster wheel 101. Rear guards 212a and 212b are also positioned symmetrically such that there is a rear guard on each side of caster wheel 101.

As described above, in a deployed state, front guards 210 and rear guards 212 provide a minimal amount of clearance with the ground to allow medical equipment 100 to be moved around while also pushing any objects such as cables, out of the way. When front guards 210 and rear guards 212 are in a fully deployed state (shown in FIG. 2B), contact between a fixed object 214 (shown in FIG. 2C) and a portion of any one of front guards 210 or rear guards 212 disposed outside housing 208 causes the corresponding guard to transition into a retracted state. Note that because the guards are independently movable with respect to each other, any one of the four guards is able to retract while the other guards stay deployed. For example, as shown in FIG. 2C, front guards 210a and 210b are in the retracted state, whereas rear guards 212a and 212b remain in the deployed state. In FIG. 2C, front guards 210a and 210b have a greater clearance with the ground than rear guards 212a and 212b. In addition, front guards 210a and 210b in the retracted state (shown in FIG. 2C) have a greater clearance with the ground than front guards 210a and 210b in the fully deployed state (shown in FIG. 2B).

When front guards 210 are in the retracted state (shown in FIG. 2C) and when the contact with fixed object 214 is removed, the corresponding guards self-deploy or transition back into the fully deployed state (shown in FIG. 2B). Although rear guards 212 are only shown in the fully deployed state, rear guards 212 function similar to front guards 210. The transition to the fully deployed state is caused by corresponding biasing elements which bias, or pre-load, each of the guards towards the fully deployed state as described in more detail below with respect to FIGS. 3A-C and 4A-4B.

Figure 3A:
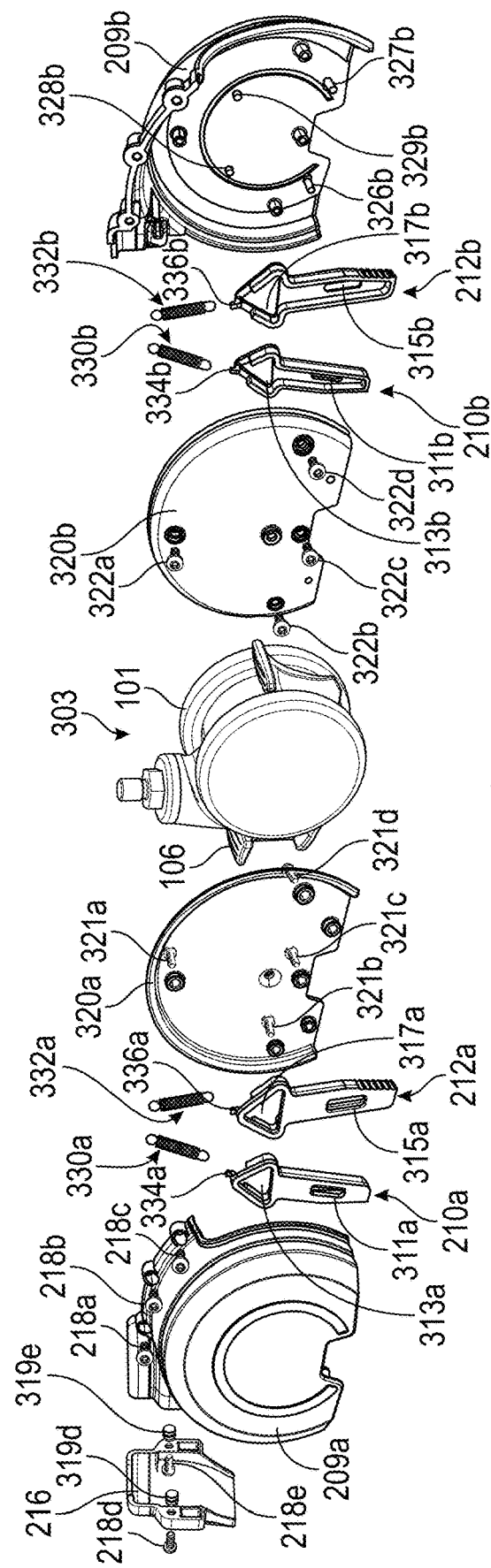
FIG. 3A illustrates an exploded view of the caster assembly of FIGS. 2A-2C, in accordance with certain embodiments of the present disclosure.

FIG. 3A illustrates an exploded view of the caster assembly 102 of FIGS. 2A-2C, according to certain embodiments. As shown, a cover 320b is coupled to housing piece 209b using screws 322. Screws 322a-322d are configured to be inserted into corresponding openings of cover 320b and corresponding threaded holes of housing piece 209b, in that order. When screws 322a-322d are inserted into all such openings, screws 322a-322d hold cover 320b and housing piece 209b together such that front guard 210b and rear guard 212b are at least partially disposed in the housing and movably coupled between cover 320b and housing piece 209b. Cover 320a functions similar to cover 320b. Cover 320a is coupled to housing piece 209a using screws 321. Screws 321a-321d are configured to be inserted into corresponding openings of cover 320a and corresponding threaded holes of housing piece 209a, in that order. When screws 321a-321d are inserted into all such openings, screws 321a-321d hold cover 320a and housing piece 209a together such that front guard 210a and rear guard 212a are at least partially disposed in the housing and movably coupled between cover 320a and housing piece 209a.

As shown, front guard 210b has a lower slot 311b corresponding to a lower pin 326b of housing piece 209b and an upper slot 313b corresponding to an upper pin 328b of housing piece 209b. When cover 320b is coupled to housing piece 209b, lower pin 326b is disposed in lower slot 311b and upper pin 328b is disposed in upper slot 313b. A first contact interface between a perimeter of lower slot 311b and corresponding lower pin 326b and a second contact interface between a perimeter of upper slot 313b and corresponding upper pin 328b limit a range of motion and guide the movement of front guard 210b as described in more detail below with respect to FIGS. 4A and 4B.

Rear guard 212b functions similar to front guard 210b. Rear guard 212b has a lower slot 315b corresponding to a lower pin 327b of housing piece 209b and an upper slot 317b corresponding to an upper pin 329b of housing piece 209b. When cover 320b is coupled to housing piece 209b, lower pin 327b is disposed in lower slot 315b and upper pin 329b is disposed in upper slot 317b. Front guard 210a and rear guard 212a function similar to front guard 210b and rear guard 212b. Front guard 210a has a lower slot 311a corresponding to a lower pin 326a (shown in FIG. 4A) of housing piece 209a and an upper slot 313a corresponding to an upper pin 328a of housing piece 209a. When cover 320a is coupled to housing piece 209a, lower pin 326a is disposed in lower slot 311a and upper pin 328a is disposed in upper slot 313a. Rear guard 212a has a lower slot 315a corresponding to a lower pin 327a (shown in FIG. 4A) of housing piece 209a and an upper slot 317a corresponding to an upper pin 329a of housing piece 209a. When cover 320a is coupled to housing piece 209a, lower pin 327a is disposed in lower slot 315a and upper pin 329a is disposed in upper slot 317a.

As shown, lower pins 326a, 326b, 327a and 327b are spaced vertically from upper pins 328a, 328b, 329a and 329b, meaning that lower pins 326a, 326b, 327a and 327b may be located closer to the ground compared to upper pins 328a, 328b, 329a and 329b. As shown, lower pins 326a, 326b, 327a and 327b and upper pins 328a, 328b, 329a and 329b extend inwardly from respective housing pieces 209a-209b and are disposed on axes which are parallel to the ground surface (e.g., an axis that passes through all the openings in the cover and is perpendicular to the outer surface of caster wheel 101). In addition, lower pins 326a, 326b, 327a and 327b are longer than upper pins 328a, 328b, 329a and 329b in order to engage respective covers 320a-320b coupled to corresponding housing pieces 209a-209b as described below. After lower pins 326a, 326b, 327a and 327b are inserted through corresponding slots 311a, 311b, 315a and 315b, lower pins 326a, 326b, 327a and 327b are further inserted into corresponding openings of covers 320a-320b. Front guard 210a and rear guard 212a are thereby movably locked between housing piece 209a and opposing cover 320a, and front guard 210b and rear guard 212b are similarly movably locked between housing piece 209b and opposing cover 320b. Front guards 210 and rear guards 212 are lengthwise oriented substantially perpendicular to the ground surface. Movement of the guards is substantially limited within a vertical plane (e.g., a plane perpendicular to the ground surface). A range of motion of each guard is limited to an area defined by contact between each slot and corresponding pin as described in more detail below with respect to FIGS. 4A and 4B.

As shown, biasing element 330b is configured to be coupled at its lower end to lower pin 326b and at its upper end to hook 334b of front guard 210b. The lower end of each biasing element refers to the end that is closer to the ground. The upper end of each biasing element refers to the end that is farther from the ground. Biasing element 330b biases an upper end of front guard 210b in the direction of lower pin 326b. Because lower pin 326b is fixed to housing piece 209b, front guard 210b is biased downward into a fully deployed state (shown in FIG. 2B). Biasing element 332b functions similar to biasing element 330b. Biasing element 332b is configured to be coupled at its lower end to lower pin 327b and at its upper end to hook 336b of rear guard 212b. Biasing elements 330a and 332a function similar to biasing elements 330b and 332b. Biasing element 330a is configured to be coupled at its lower end to lower pin 326a and at its upper end to hook 334a of front guard 210a. Biasing element 332a is configured to be coupled at its lower end to lower pin 327a and at its upper end to hook 336a of rear guard 212a.

The components that are held together using screws 321a-321d and the components that are held together using screws 322a-322d are configured to be coupled together by screwing housing piece 209a to housing piece 209b using screws 218a-218c. Screws 218a-218c are configured to be inserted into corresponding openings of housing piece 209a and corresponding threaded holes of housing piece 209b, in that order. When housing piece 209a and housing piece 209b are coupled together and mounted on a corresponding caster, collar 216 is coupled to the assembled housing pieces using screws 218d-218e and corresponding screw caps 319d-319e.

Figure 3B:
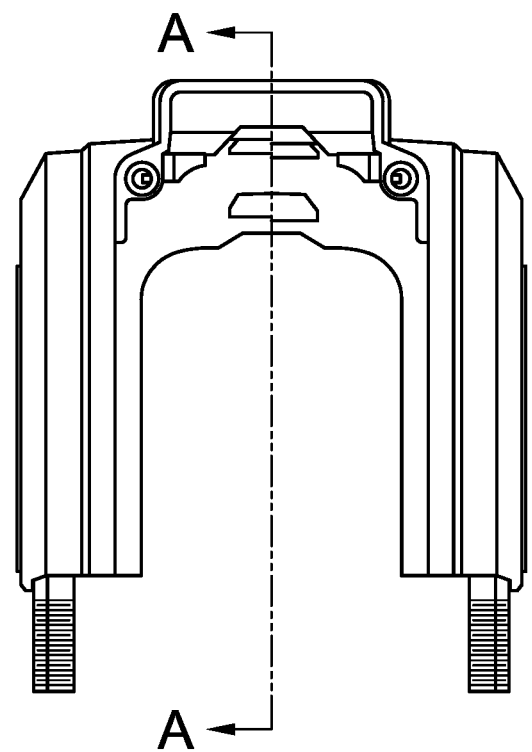
FIGS. 3B-C illustrate possible dimensions shown for a cross-section of an embodiment for the caster assembly, in accordance with certain embodiments of the present disclosure.
Figure 3C:
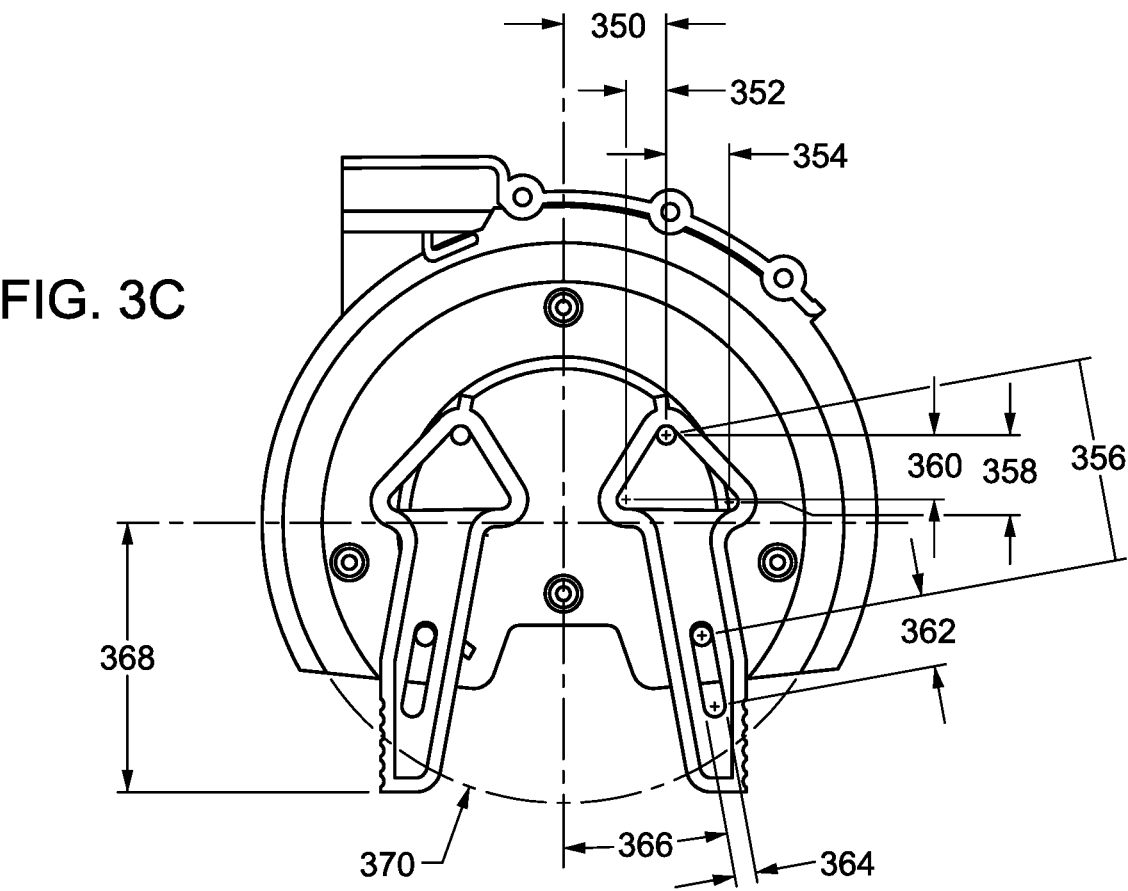

FIGS. 3B-C illustrate possible dimensions shown for a cross-section of an embodiment for the caster assembly, in accordance with certain embodiments of the present disclosure. FIG. 3C illustrates the cross section taken at A as indicated in FIG. 3B. In the cross-section shown in FIG. 3C, the screws 322a-d and biasing elements 330b and 332b have been removed for clarity. In some embodiments, a distance 350 between a centerline and upper pin 329b may be approximately in a range of 0.4 to 1.4 inches, such as 0.9 inches. In some embodiments, a horizontal distance 352 between the upper pin 329b and a left radial formation of the rear guard 312b may be approximately in a range of 0.05 to 0.7 inches, such as 0.344 inches. In some embodiments, a horizontal distance 354 between the upper pin 329b and a right radial formation of the rear guard 312b may be approximately in a range of 0.25 to 0.8 inches, such as 0.549 inches. In some embodiments, a distance 356 between the upper pin 329b and the lower pin 327b may be approximately in a range of 1.2 to 2.25 inches, such as 1.770 inches. In some embodiments, a vertical distance 358 between the upper pin 329b and a right radial formation of the rear guard 312b may be approximately in a range of 0.3 to 0.9 inches, such as 0.594 inches. In some embodiments, a vertical distance 360 between the upper pin 329b and a left radial formation of the rear guard 312b may be approximately in a range of 0.3 to 0.9 inches, such as 0.568 inches. In some embodiments, a length 362 of slot 315b may be approximately in a range of 0.25 to 1.0 inches, such as 0.650 inches. In some embodiments, a width 364 of slot 315b may be approximately in a range of 0.05 to 0.4 inches, such as 0.180 inches. In some embodiments, an angle 366 between the centerline and a line running through the center of slot 315b and upper pin 329b may be approximately in a range of 5 to 25 degrees, such as 10 degrees. In some embodiments, a vertical distance 368 between the bottom of the left and right radial formations and the bottom of the rear guard 312b may be approximately in a range of 1 to 4 inches, such as 2.367 inches. In some embodiments, a wheel diameter 370 may be approximately in a range of 3 to 7 inches, such as 4.921 inches. While several example dimensions have been provided above, it is to be understood that other dimensions are also contemplated. For example, if the wheel diameter is smaller or larger than indicated above, the dimensions may be appropriately scaled to suit the different size wheel. Further, other angles and dimensions are also suitable for the caster described herein and the examples above are not meant to be limiting, but instead illustrative of a possible caster embodiment.

Figure 4A:
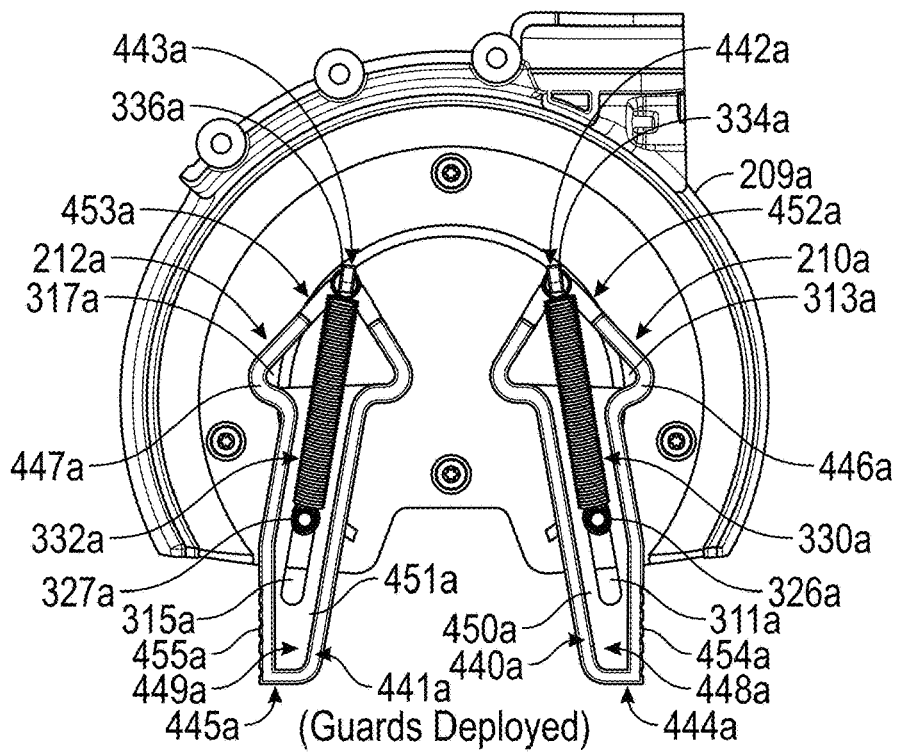
FIG. 4A illustrates an internal side view of a front guard and a rear guard in a deployed state, in accordance with certain embodiments of the present disclosure.

FIG. 4A illustrates an internal side view of front guard 210a, rear guard 212a, and housing piece 209a. In FIG. 4A, front guard 210a and rear guard 212a are in a fully deployed state. In the fully deployed state, lower pins 326a and 327a are positioned at upper ends of each of lower slots 311a and 315a. Further, in the fully deployed state, upper pins 328a and 329a (which are not visible as they located behind respective biasing elements 330a and 332a in FIG. 4A) are positioned at upper ends of each of upper slots 313a and 317a. The upper end of each slot refers to the end that is farther from the ground. The lower end of each slot refers to the end that is closer to the ground. As shown, body 440a of front guard 210a has a first end 442a disposed inside a perimeter of housing piece 209a and second end 444a disposed outside the perimeter of housing piece 209a. The perimeter of housing piece 209a refers to an area inside housing piece 209a when viewed from the side. In the fully deployed state, front guard 210a has a first clearance with the ground which is at a minimum. The clearance with the ground refers to a distance from the ground to second end 444a, in which the distance is measured perpendicular to the ground surface.

Body 440a has a sidewall 446a extending at least partially around a perimeter of body 440a. Sidewall 446a refers to a raised portion of body 440a which defines an inner cavity 448a between opposing portions of sidewall 446a. Body 440a has a leading edge 454a formed along a portion of sidewall 446a disposed outside the perimeter of housing piece 209a. The leading edge refers to an outward-facing portion of each guard which is configured to make the first contact with objects as medical equipment 100 is moved around on caster assemblies 102. Leading edge 454a is perpendicular to the ground surface to provide a larger surface area for objects to contact front guard 210a from the front. In certain other embodiments, leading edge 454a is non-perpendicular to the ground surface. In certain embodiments, leading edge 454a has a surface profile (e.g., horizontal or vertical ridges, a grid pattern, or any suitable surface texture) to increase friction and prevent slipping between leading edge 454a and contacting objects.

Body 440a has an outer face 450a enclosing inner cavity 448a on one side (e.g., on a side closer to housing piece 209a as shown). Outer face 450a extends between opposing portions of sidewall 446a. Lower slot 311a and upper slot 313a are defined in outer face 450a. Hook 334a is disposed at first end 442a of body 440a. The upper end of biasing element 330a fits around hook 334a to couple biasing element 330a to front guard 210a. A notch 452a is formed through sidewall 446a at first end 442a of body 440a. Notch 452a provides an opening for biasing element 330b to extend through sidewall 446a in order to couple to hook 334a. As shown, biasing element 330a fits within inner cavity 448a. The lower end of biasing element 330a fits around lower pin 326a to couple biasing element 330a to housing piece 209a.

Rear guard 212a, front guard 210b, and rear guard 212b are each constructed and arranged similar to front guard 210a. For example, referring to rear guard 212a (shown in FIG. 4A), body 441a of rear guard 212a has a first end 443a disposed inside a perimeter of housing piece 209a and a second end 445a disposed outside the perimeter of housing piece 209a. Body 441a has a sidewall 447a extending at least partially around a perimeter of body 441a. Body 441a has a leading edge 455a formed along a portion of sidewall 447a disposed outside the perimeter of housing piece 209a. Leading edge 455a is perpendicular to the ground surface to provide a larger surface area for objects to contact rear guard 212a from the rear. In certain other embodiments, leading edge 455a is non-perpendicular to the ground surface. In certain embodiments, leading edge 455a has a surface profile (e.g., horizontal or vertical ridges, a grid pattern, or any suitable surface texture) to increase friction and prevent slipping between leading edge 455a and contacting objects. As shown behind biasing element 332a, body 441a has an outer face 451a enclosing an inner cavity 449a on one side (e.g., on a side closer to housing piece 209a as shown). Outer face 451a extends between opposing portions of sidewall 447a. Lower slot 315a and upper slot 317a are defined in outer face 451a. Hook 336a is disposed at first end 443a of body 441a. The upper end of biasing element 332a fits around hook 336a to couple biasing element 332a to rear guard 212a. A notch 453a is formed through sidewall 447a at first end 443a of body 441a. Notch 453a provides an opening for biasing element 332b to extend through sidewall 447a in order to couple to hook 336a. As shown, biasing element 332a fits within inner cavity 449a. The lower end of biasing element 332a fits around lower pin 327a to couple biasing element 332a to housing piece 209a.

Figure 4B:
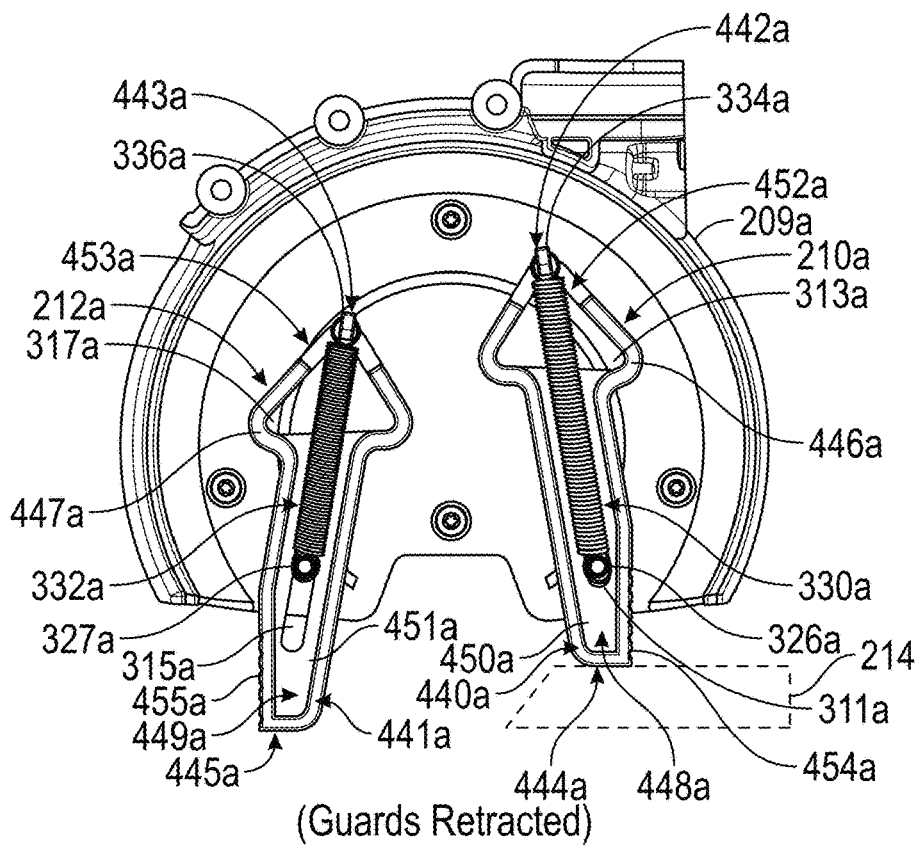
FIG. 4B illustrates an internal side view of the front guard of FIG. 4A in a retracted state, in accordance with certain embodiments of the present disclosure.

FIG. 4B illustrates an internal side view of front guard 210a, rear guard 212a, and housing piece 209a. In FIG. 4B, rear guard 212a remains in the fully deployed state, whereas front guard 210a has transitioned into a retracted state. As shown, front guard 210a is in a fully retracted state. Note that, in certain embodiments, any state other than the fully deployed state may be considered as a retracted or a partially retracted state. Such a state may also be considered as a partially deployed state. As shown, contact between a portion of front guard 210a disposed outside housing 209a (e.g., leading edge 454a or second end 444a) and fixed object 214 causes front guard 210a to transition into the retracted state. In the fully retracted state, lower pin 326a is positioned at a lower end of lower slot 311a and upper pin 328a (which is located behind biasing element 330a in FIG. 4B) is positioned at a lower end of upper slot 313a. In the retracted state, front guard 210a is transitioned upwards against downward biasing force of biasing element 330a. In the retracted state, front guard 210a has a second clearance with the ground which is greater than the first clearance shown in FIG. 4A. In FIG. 4B, which shows front guard in the fully retracted state, the second clearance is at a maximum. In the retracted state, biasing element 330a is extended compared to the same biasing element in the deployed state. As shown in FIG. 4B, biasing element 330a is also extended compared to biasing element 332a. The retraction of front guard 210a is described in more detail below with respect to FIGS. 5A-5D.

Figure 5A:
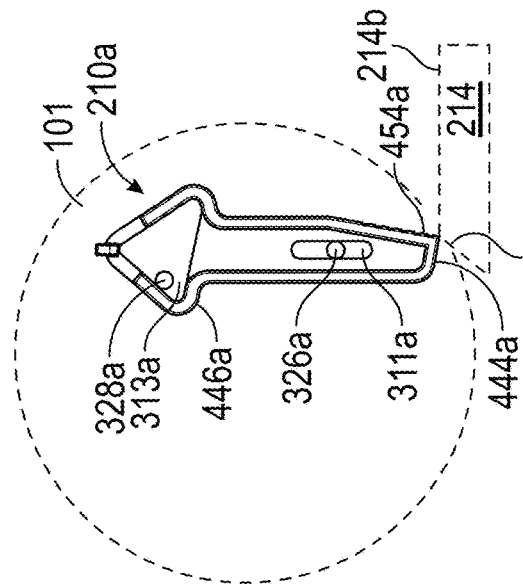
FIGS. 5A-5D illustrate motion of the front guard of FIG. 4A during contact with and subsequent movement over a fixed object, in accordance with certain embodiments of the present disclosure.

FIGS. 5A-5D illustrate motion of front guard 210a relative to lower pin 326a and upper pin 328a during contact with and subsequent movement over fixed object 214. For clarity, all other components of caster assembly 102 are omitted from FIGS. 5A-5D with the exception of caster wheel 101 which is shown in phantom. As shown in FIG. 5A, caster wheel 101 is positioned on the left side of fixed object 214, and front guard 210 is in the fully deployed state. In the fully deployed state, lower pin 326a is positioned at the upper end of lower slot 311a and upper pin 328a is positioned at the upper end of upper slot 313a. Front guard 210a is centered with respect to upper pin 328a due to front guard 210a being biased downward in combination with the shape of upper slot 313a which converges at the upper end.

Figure 5C:
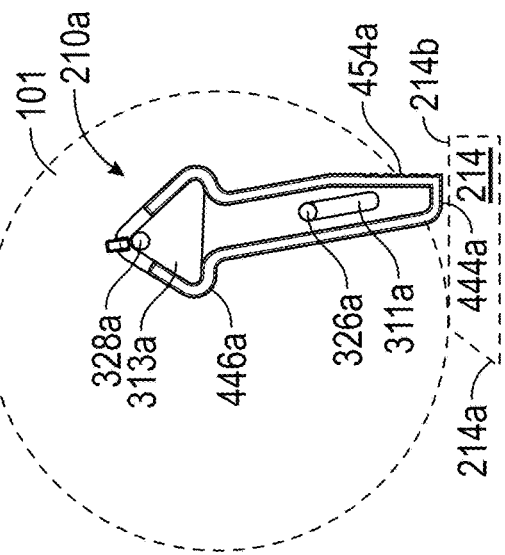
Figure 5B:
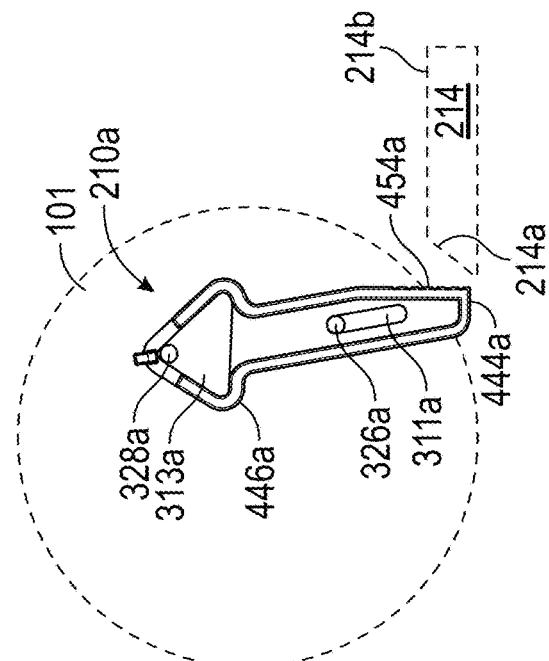

As shown in FIG. 5B, caster wheel 101 has moved closer to fixed object 214, and front guard 210a has transitioned into a first retracted state. Note that caster wheel 101 is still spaced from fixed object 214 in the position shown in FIG. 5B. As shown, leading edge 454a of front guard 210a is in contact with a left side 214a of fixed object 214. Movement (e.g., retraction) of front guard 210a is guided in first part by contact between a perimeter of lower slot 311a and corresponding lower pin 326a and in second part by contact between a perimeter of upper slot 313a and corresponding upper pin 328a. Lower slot 311a has a linear shape which is configured to confine translational motion of front guard 210a to only two directions. In other words, a width of lower slot 311a is about the same as a diameter of lower pin 326a so that lower pin 326a can only move in two directions (e.g., up and down) within lower slot 311a. In contrast to lower slot 311a, upper slot 313a has a non-linear shape which is configured to permit translational motion of front guard 210a in any direction. In other words, a width and length of upper slot 313a are both greater than a diameter of upper pin 328a so that upper pin 328a can move in any direction (e.g., up, down, left, and right) within upper slot 313a. As shown, upper slot 313a is triangular. Alternatively, upper slot 313a may be square, rectangular, circular, or any other suitable non-linear shape.

The motion of upper slot 313a in any direction relative to upper pin 328a allows lower slot 311a to rotate about a longitudinal axis of lower pin 326a in addition to translating on the longitudinal axis of lower slot 311a. Therefore, as front guard 210a contacts left side 214a of fixed object 214 at leading edge 454a, a lateral force is exerted on front guard 210a causing front guard 210a and lower slot 311a to rotate clockwise about the longitudinal axis of lower pin 326a. Rotation of front guard 210a causes a left side of sidewall 446a (which corresponds to the perimeter of slot 313a) to translate in contact with upper pin 328a. The shape of upper slot 313a (which diverges in a downward direction) and complementary angle of sidewall 446a causes front guard 210a to move upwards causing lower slot 311a to translate in contact with lower pin 326a as shown.

As shown in FIG. 5C, caster wheel 101 has moved into contact with fixed object 214, and front guard 210a has transitioned into a second retracted state which has a greater clearance with the ground compared to the first retracted state shown in FIG. 5B. In FIG. 5C, caster wheel 101 is in contact with an edge connecting side 214a and top surface 214b of fixed object 214. Comparing FIGS. 5B and 5C, continued application of the lateral force on front guard 210a continues the clockwise rotation of front guard 210a and lower slot 311a about the longitudinal axis of lower pin 326a which continues the upward movement of front guard 210a as left side of sidewall 446a continues to translate in contact with upper pin 328a and lower slot 311a continues to translate in contact with lower pin 326a. As shown in FIG. 5C, front guard 210a is disposed completely within a perimeter of caster wheel 101. Therefore, the retraction of front guard 210a is at a maximum for the depicted movement of caster wheel 101 over fixed object 214.

Figure 5D:
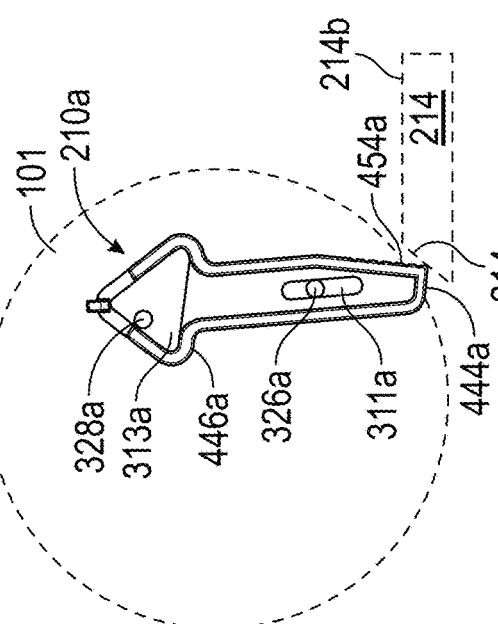

As shown in FIG. 5D, caster wheel 101 has moved onto top surface 214b of fixed object 214, and front guard 210a has transitioned into the fully deployed state. Although not shown, after initial movement of caster wheel 101 onto top surface 214b of fixed object 214, second end 444a of front guard 210a moves into contact with top surface 214b. At this point, the lateral force exerted on front guard 210a is removed. Instead, a vertical force is exerted against second end 444a maintaining front guard 210a in a retracted state. Continued movement of caster wheel 101 along top surface 214b provides greater clearance between second end 444a of front guard 210a and top surface 214b of fixed object 214 allowing front guard 210a to transition to the fully deployed state shown FIG. 5D. Although not shown, continued movement of caster wheel 101 in the direction shown may result in rear guard 212b contacting a right side of fixed object 214 as caster wheel 101 moves off fixed object 214 and back onto the ground surface. In certain examples, a trailing edge of rear guard 212a opposite leading edge 455a or second end 445a of rear guard 212a (shown in FIGS. 4A-4B) may contact the right side of fixed object 214 causing rear guard 212a to transition to a third retracted state.

Although not shown in operation, a structure and function of rear guard 212a (shown in FIGS. 4A-4B) mirrors that of front guard 210a such that rear guard 212a is able to yield to fixed objects approaching from a direction opposite that which is shown in FIGS. 5A-5D. In such examples, as rear guard 212a contacts a right side of fixed object 214 at leading edge 455a, a lateral force is exerted on rear guard 212a causing rear guard 212a and lower slot 315a to rotate counterclockwise about a longitudinal axis of lower pin 327a. Rotation of rear guard 212a causes a right side of sidewall 447a (which corresponds to the perimeter of slot 317a) to translate in contact with upper pin 329a. The shape of upper slot 317a (which diverges in a downward direction) and complementary angle of sidewall 447a causes rear guard 212a to move upwards causing lower slot 315a to translate in contact with lower pin 327a.

Accordingly, certain embodiments described herein provide retractable guard assemblies that can be used in conjunction with caster wheels of an equipment. The retractable guard assemblies can be deployed to push objects, such as cables and hoses, aside when the equipment is being moved around. The retractable guard assemblies can also retract when the equipment is moved over fixed obstacles such as doorsills and elevator sills or non-fixed but difficult-to-move obstacles such as floor mats.

The foregoing description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with the language of the claims.

What is claimed is:

1. A retractable guard assembly coupled to a caster of a mobile equipment, comprising:
   a housing;
   one or more guards at least partially disposed in the housing, wherein the one or more guards are independently movably coupled to the housing; and
   corresponding one or more biasing elements coupled to the one or more guards and to the housing for biasing the one or more guards towards a fully deployed state, wherein:
      when the one or more guards are in the fully deployed state, contact between a fixed object and a portion of the one or more guards disposed outside the housing causes the one or more guards to transition into a retracted state,
      when the one or more guards are in the retracted state and when the contact is removed, the corresponding one or more biasing elements cause the one or more guards to transition into the fully deployed state,
      in the fully deployed state, the one or more guards have a first clearance with the ground,
      in the retracted state, the one or more guards have a second clearance with the ground, and
      the second clearance is larger than the first clearance;
   wherein each of the one or more guards comprises:
      a first slot corresponding to a first pin of the housing; and
      a second slot corresponding to a second pin of the housing, wherein a range of motion of the one or more guards is limited to an area defined by a first contact between the first slot and the corresponding first pin and a second contact between the second slot and the corresponding second pin;
   wherein each of the one or more guards further comprises:
      a body having a first end disposed in the housing and second end disposed outside the housing, the body comprising:
         a sidewall defining an inner cavity;
         an outer face enclosing the inner cavity on one side, wherein the first and second slots are defined in the outer face; and
         a hook at the first end of the body configured to couple the corresponding one or more biasing elements to the one or more guards.

2. The retractable guard assembly of claim 1, wherein the sidewall comprises a notch at the first end of the body, and wherein the corresponding one or more biasing elements fit within the inner cavity and extend through the notch to couple to the hook.

3. The retractable guard assembly of claim 1, wherein the first slot is configured to permit translational motion of the one or more guards in any direction, and wherein the second slot is configured to confine translational motion of the one or more guards to only two directions.

4. The retractable guard assembly of claim 1, wherein:
   the transition of the one or more guards into the retracted state is guided by the first contact between a perimeter of the first slot and corresponding first pin and by the second contact between a perimeter of the second slot and corresponding second pin,
   during the transition into the retracted state, the second slot rotates about a longitudinal axis of the second pin and translates in a first direction along a first axis, and
   during the transition into the retracted state, the first slot translates in a second direction comprising in first part along the first axis and in second part along a second axis perpendicular to the first axis.

5. The retractable guard assembly of claim 1, wherein:
   when the one or more guards are in the fully deployed state, the first pin is positioned at a first upper end of the corresponding first slot and the second pin is positioned at a second upper end of the corresponding second slot, and
   when the one or more guards are in a fully retracted state, the first pin is positioned at a first lower end of the corresponding first slot and the second pin is positioned at a second lower end of the corresponding second slot.

6. The retractable guard assembly of claim 1, wherein:
   in the fully deployed state the one or more guards are configured to push an object aside while the mobile equipment is moving, and
   in the retracted state the second clearance provides enough distance from the ground such as to allow the mobile equipment to move over fixed objects.

7. The retractable guard assembly of claim 1, wherein the one or more guards comprise two pairs of guards positioned on opposite sides of a wheel of the caster in a symmetrical manner.

8. A caster assembly of a mobile equipment, comprising:
   a caster comprising a caster wheel;
   a retractable guard assembly coupled to the caster, the retractable guard assembly comprising:
      a housing;
      one or more guards at least partially disposed in the housing, wherein the one or more guards are independently movably coupled to the housing; and
      corresponding one or more biasing elements coupled to the one or more guards and to the housing for biasing the one or more guards towards a fully deployed state, wherein:
         when the one or more guards are in the fully deployed state, contact between a fixed object and a portion of the one or more guards disposed outside the housing causes the one or more guards to transition into a retracted state,
         when the one or more guards are in the retracted state and when the contact is removed, the corresponding one or more biasing elements cause the one or more guards to transition into the fully deployed state, in the fully deployed state, the one or more guards have a first clearance with the ground, in the retracted state, the one or more guards have a second clearance with the ground, and the second clearance is larger than the first clearance;

wherein each of the one or more guards comprises:
a first slot corresponding to a first pin of the housing; and
a second slot corresponding to a second pin of the housing, wherein a range of motion of the one or more guards is limited to an area defined by a first contact between the first slot and corresponding first pin and a second contact between the second slot and corresponding second pin;

wherein each of the one or more guards further comprises:
a body having a first end disposed in the housing and second end disposed outside the housing, the body comprising:
a sidewall defining an inner cavity;
an outer face enclosing the inner cavity on one side, wherein the first and second slots are defined in the outer face; and
a hook at the first end of the body configured to couple the corresponding one or more biasing elements to the one or more guards.

9. The caster assembly of claim 8, wherein the first slot is configured to permit translational motion of the one or more guards in any direction, and wherein the second slot is configured to confine translational motion of the one or more guards to only two directions.

10. The caster assembly of claim 8, wherein:
the transition of the one or more guards into the retracted state is guided by the first contact between a perimeter of the first slot and corresponding first pin and by the second contact between a perimeter of the second slot and corresponding second pin,
during the transition into the retracted state, the second slot rotates about a longitudinal axis of the second pin and translates in a first direction along a first axis, and
during the transition into the retracted state, the first slot translates in a second direction comprising in first part along the first axis and in second part along a second axis perpendicular to the first axis.

11. The caster assembly of claim 8, wherein:
in the fully deployed state the one or more guards are configured to push an object aside while the mobile equipment is moving, and
in the retracted state the second clearance provides enough distance from the ground such as to allow the mobile equipment to move over fixed objects.

* * * * *